April 5, 1960　　　J. H. HAMMOND, JR., ET AL　　　2,931,858
TELEVISION RECONNAISSANCE SYSTEM
Filed Oct. 3, 1955　　　　　　　　　　　　　　　　6 Sheets-Sheet 1

INVENTORS
JOHN HAYES HAMMOND, JR
EMORY LEON CHAFFEE
BY

ATTORNEY

April 5, 1960     J. H. HAMMOND, JR., ET AL     2,931,858
TELEVISION RECONNAISSANCE SYSTEM
Filed Oct. 3, 1955                                        6 Sheets-Sheet 3

START OF EXPOSURE

START OF SCANNING

INVENTORS
JOHN HAYES HAMMOND, JR
EMORY LEON CHAFFEE
BY
ATTORNEY

April 5, 1960     J. H. HAMMOND, JR., ET AL     2,931,858
TELEVISION RECONNAISSANCE SYSTEM
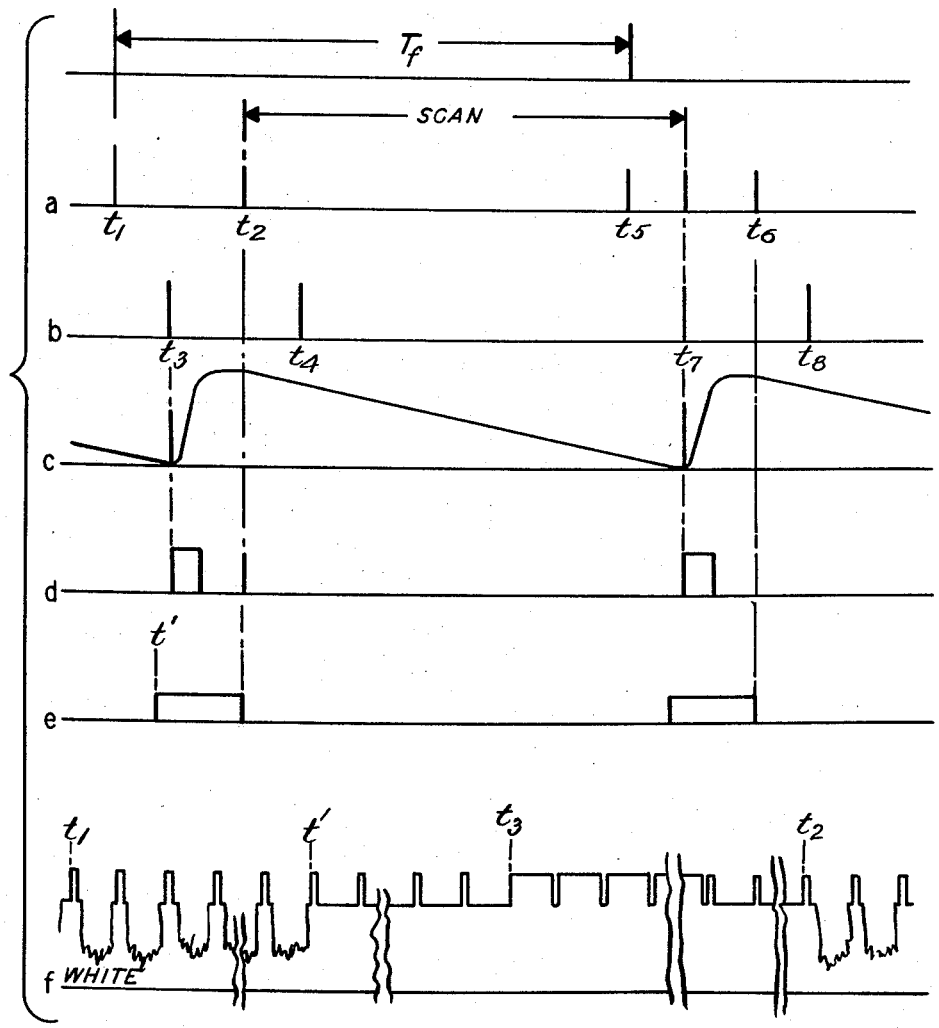
FIG. 7
INVENTORS
JOHN HAYES HAMMOND JR
EMORY LEON CHAFFEE
BY 
ATTORNEY

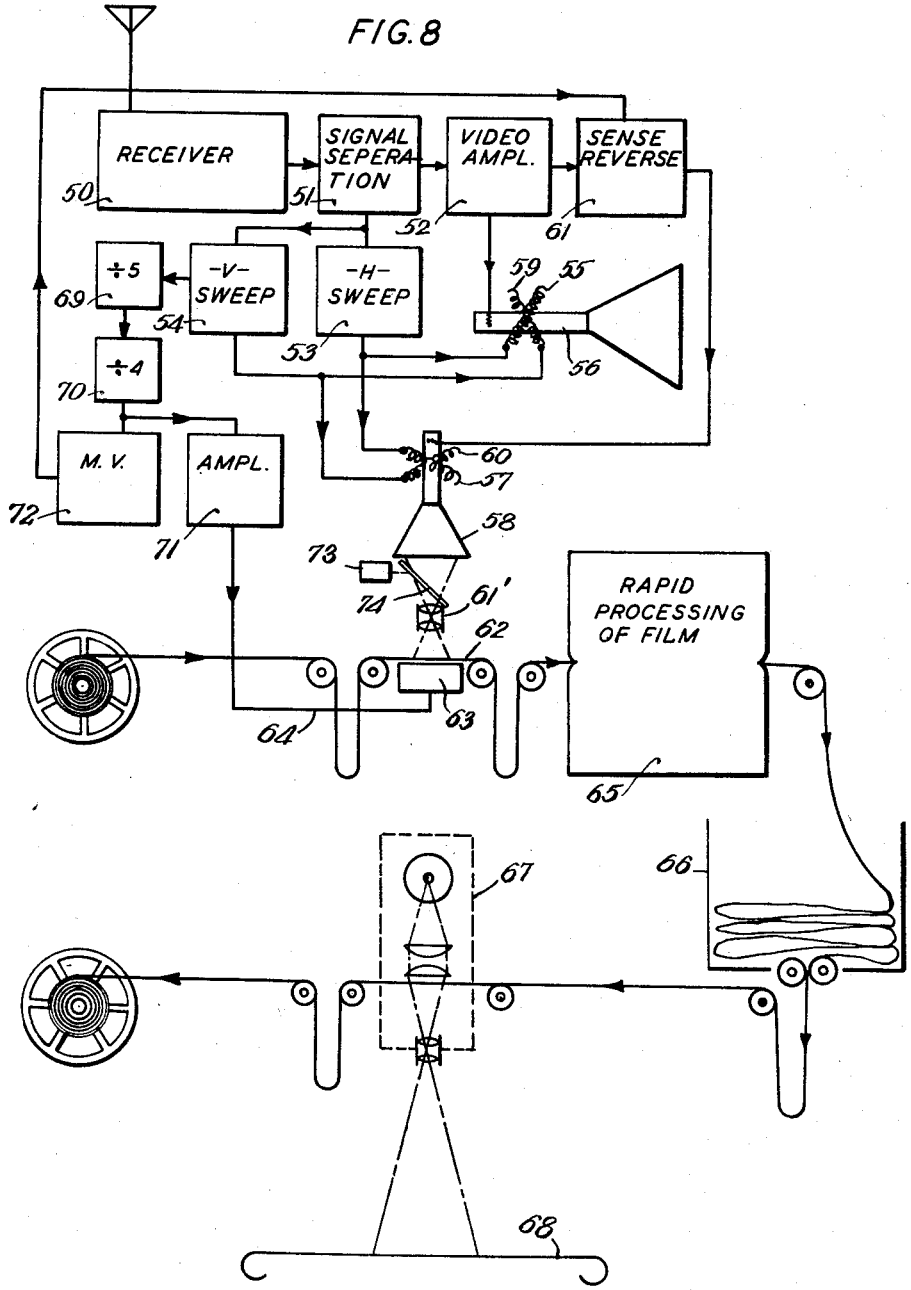

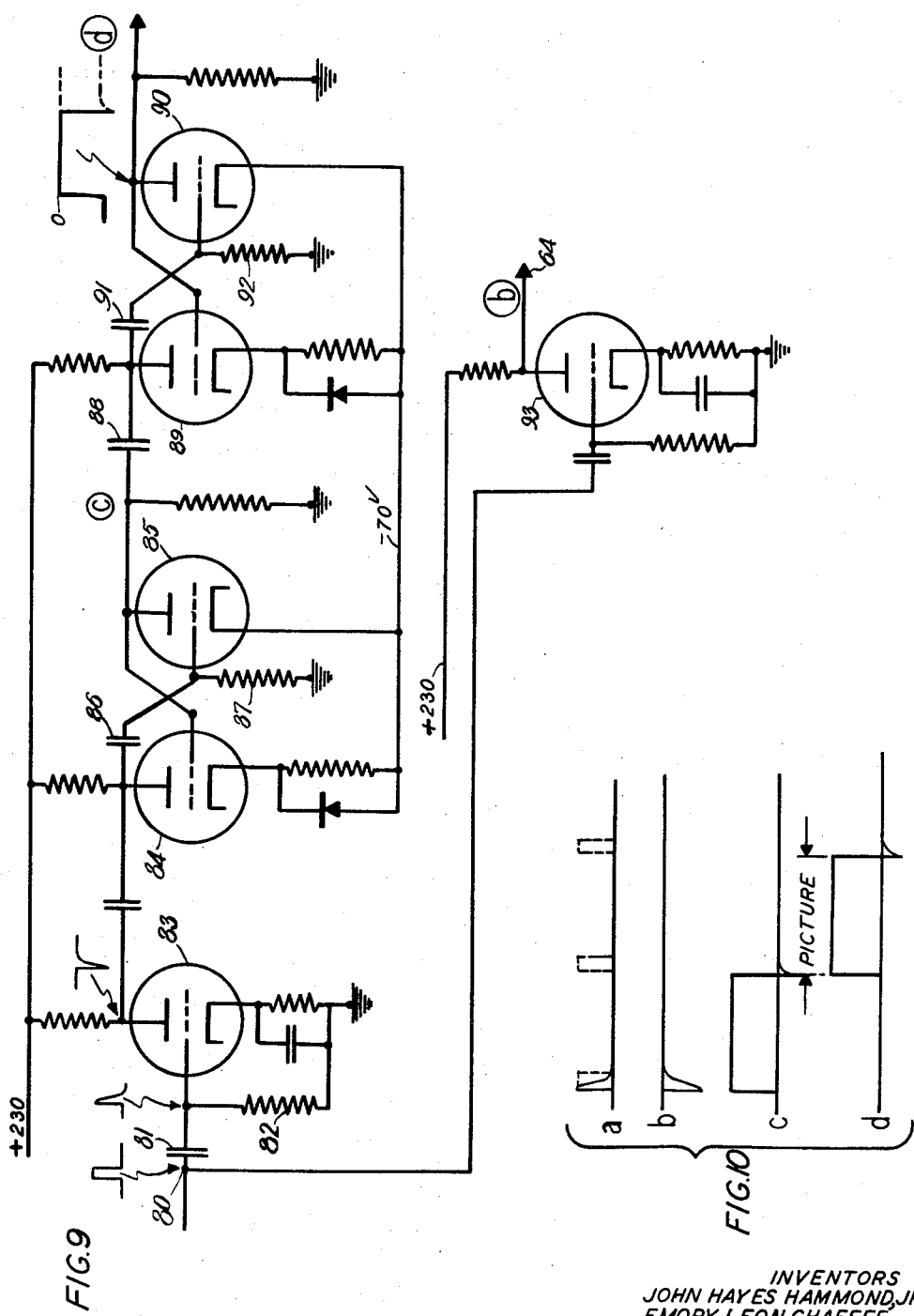

р

United States Patent Office 2,931,858
Patented Apr. 5, 1960

2,931,858
TELEVISION RECONNAISSANCE SYSTEM

John Hays Hammond, Jr., Gloucester, and Emory Leon Chaffee, Belmont, Mass.; said Chaffee assignor to said Hammond, Jr.

Application October 3, 1955, Serial No. 538,065

2 Claims. (Cl. 178—6.7)

This invention relates to a ground survey system utilizing a televised image which is transmitted from a moving plane or the like.

An object of this invention is to provide means by which television views of the terrain as seen from an observation plane can be transmitted to a ground or other station where they can be observed as though the observer were at the same instant looking from the plane.

Another object is to provide means at the ground or other station for photographically recording periodic instantaneous views of the terrain to provide a series of recorded views of the terrain passed over by the plane.

A further object of the invention is to provide means for processing the photographic record and projecting positive views a few seconds after the plane passes over the terrain thus recorded.

A still further object of the invention is to provide a permanent record of the terrain traversed by the observation plane even if the plane is expended.

The invention comprises a transmitting station located in an aeroplane and a receiving and recording station located on the ground or elsewhere.

At the transmitting station a television-type camera, provided with a suitable pick-up tube such as an image orthicon, and a lens, is mounted so as to view in a direction making an angle $\theta$ with the vertical. The angle $\theta$ may be of the order of 60 degrees, for example. The vertical plane containing the viewing axis may make any angle with the forward direction such as zero degrees. The field of view of the camera therefore includes a large area of the ground extending from a point a short distance ahead of the plane to a point a thousand feet or more forward depending upon the altitude of the plane and the angle $\theta$.

The frame frequency of the television camera, which is adapted to provide a non interlaced raster, is any suitable value such as 40 per second. The frame time is made up of the exposure period, such as, say, a quarter of the whole frame period, and the scanning and transmitting period. During the exposure period the moving image on the pick-up tube is held fixed in position by a special device to be described later. Such a procedure gives a clear stationary view during the exposure period which is made sufficiently long to store an adequate electrical image on the screen of the pick-up tube.

The division of the frame period into the exposure and transmitting periods is effected by a rotating disk shutter driven by a synchronous motor operated by power from a master oscillator. This motor also drives the image immobilizing device in proper phase with respect to the exposure period.

The video signals from the pick-up tube modulate a short-wave transmitter. Transmission to the receiving station, may be effected either by directed or non directed radio waves.

At the receiving station the signals are rectified by a standard receiver to yield the video and synchronizing signals. The video signals actuate a picture tube to give moving-picture views of the terrain passed over by the reconnaissance plane.

The video signals at the receiver are also passed through a sense reverser and then feed a projection-type picture tube. The reversal of the signal causes the picture on the projection tube to be the negative of the picture seen on the observation picture tube.

The projection picture tube is controlled by a counter so that it displays one frame every $n$ frames, where $n$ may be from 20 to a hundred or more according to the altitude and speed of the plane.

The intermittent negative pictures on the screen of the projection tube are photographed on a film which is controlled by timing circuits to advance at the proper times. The local time is automatically photographed on the margin of each picture for identification.

The film is rapidly processed and is then stored in a reservoir. The film may be drawn from the reservoir at any time and any speed desired. It is then passed through a projector which gives positive enlarged views of the terrain soon after being viewed by the camera in the plane.

The local time is automatically photographed on the margin of each recorded view for identification.

The usual sound channel of the short wave transmitter and receiver may be used for telephonic communication between the observer at the receiving station and the operator in the plane.

The invention also consists in certain new and original features of construction and combinations of parts hereinafter set forth and claimed.

The nature of the invention, as to its objects and advantages, the mode of its operation and the manner of its organization, may be better understood by referring to the following description, taken in connection with the accompanying drawings forming a part thereof, in which Figure 1 is a time diagram showing the plane and the angle of view;

Figure 7 shows some of the electrical wave forms necessary for the operation of the invention;

Figure 8 is a schematic and block diagram of the receiver;

Figure 9 is a schematic circuit diagram of the timing circuits for controlling the exposure and the advance of the film;

Figure 10 shows some of the electrical wave forms which exist at certain specified points in Fig. 9.

Like reference characters denote like parts in the several figures of the drawing.

In the following description parts will be identified by specific names for convenience, but they are intended to be generic in their application to similar parts.

Figure 1:
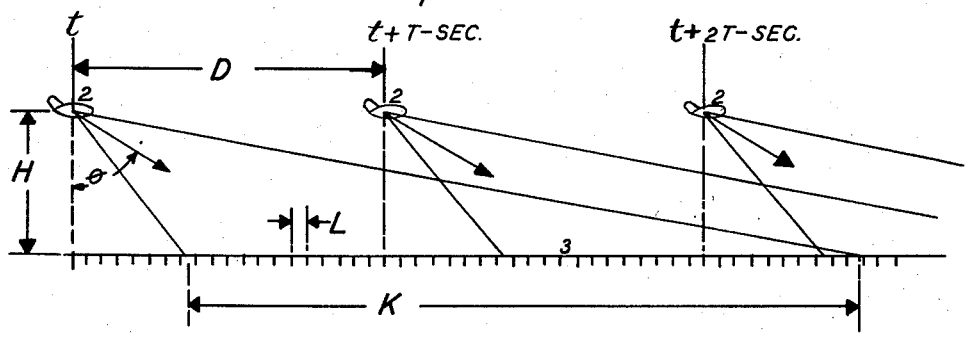

In Figure 1 an aeroplane 2 is flying at a speed S feet per second at an altitude of H feet above the ground 3. The camera is pointed in a direction making an angle of $\theta$ with the vertical, and takes in a view of the ground K feet in extent in the direction of the shorter dimension of the active screen in the pick-up tube. If the frame time is $T_f$, the plane travels a distance of L feet in $T_f$ seconds, where $L=ST_f$. If S is say 880 feet per second, and $T_f$ is $\frac{1}{40}$ second, then L is 22 feet. An instantaneous view of the extent of ground K is transmitted at the first position of the plane in Figure 1 indicated as at time $t$. After the plane has travelled a distance D in T seconds, where the speed of the plane $S=D/T$, another instantaneous view of the ground is transmitted to the receiving station. Thus at successive times separated by T seconds views are transmitted which overlap somewhat as indicated in Figure 1. The picture period T is much greater than the frame period $T_f$; and is related to it by the expression $$T = \frac{D}{L} T_f$$

The ratio $D/L$ is an integer and may have a value ranging from 20 to 150 or more according to the ratio $H/S$. The image formed on the screen of the pick-up tube, which may be an image orthicon, must remain on the screen for a sufficient time to build up an adequate electrical image. Hence the exposure period is made equal to the frame period $T_f$ divided by an integer $p$, as indicated in line $a$ of Figure 2. The remaining portion of the frame period is devoted to the scanning and transmission of the image. A picture is transmitted to the receiver during the scanning period of each frame period, but a photographic record is made at the receiver every $n$ frame periods, where $n$ is, as already mentioned, a large integer.

Figure 2:
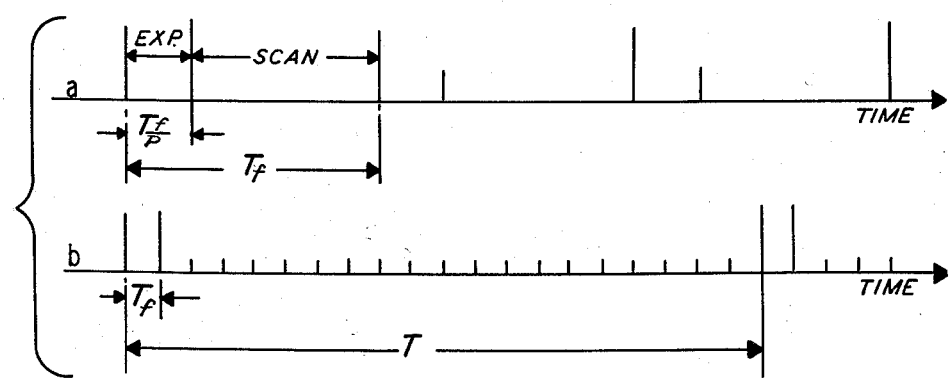
Figure 2 is a time diagram showing the sequence of events in the operation of the invention.
Figure 2:

In Figure 2 line $b$ the frame times are indicated by short vertical lines, and the recorded frames by the longer vertical lines.

Figure 3:
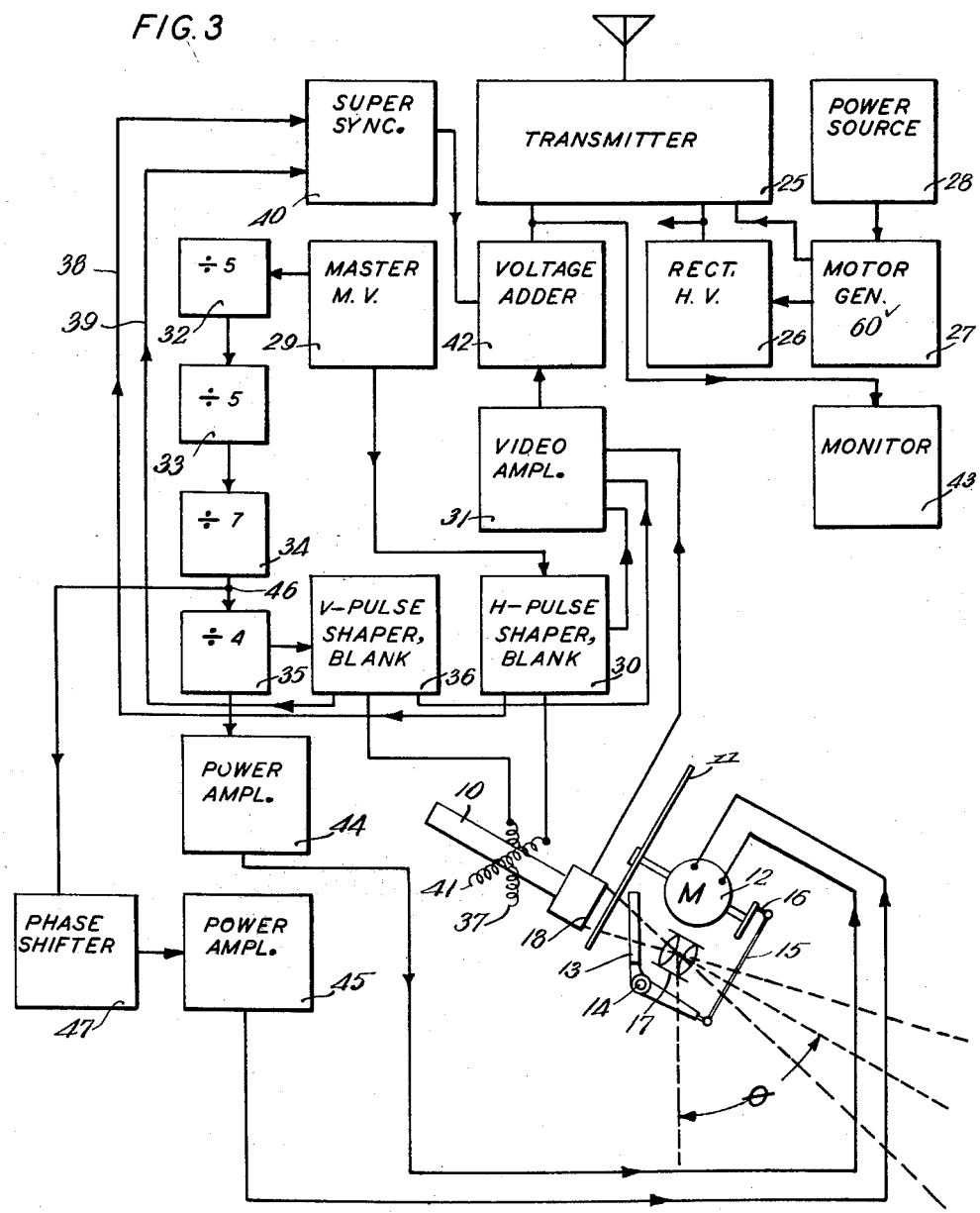
Figure 3 is a schematic and block diagram of the transmitter.

Figure 3 shows in block form the interconnection of the various electrical circuits, all of well-known structure, and a schematic diagram of the camera system including the optical structure and the mechanical portion.

The camera comprises the pick-up tube 10, a rotating shutter 11 driven by synchronous motor 12, and the image immobilizer 13 which is caused to oscillate about axis 14 by the mechanical link 15 connected to a crank 16 on the shaft of motor 12. A lens 17 casts an image of the ground upon the active screen 18 of tube 10.

Figure 4:
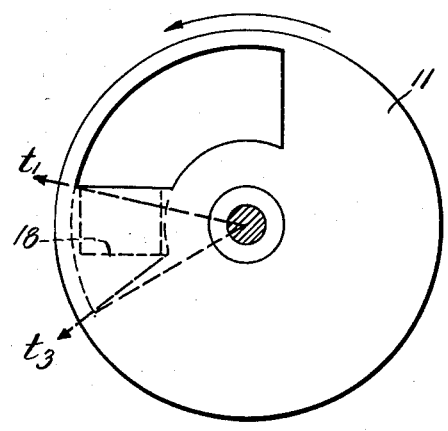
Figure 4 shows one form of the shutter used in the transmitter at the position for the start of exposure.
Figure 5:
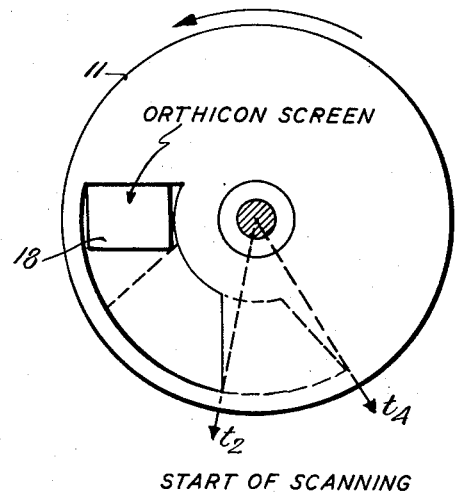
Figure 5 shows the shutter at the position for the beginning of scanning.

The shutter is shown in more detail in Figures 4 and 5. The disk 11 has an opening which subtends at its outer and inner edge an angle equal to 360 degrees divided by $p$. In the form of the shutter shown in Figures 4 and 5, $p$ is taken to be 4. The active screen of the pick-up tube 10 is indicated by the rectangle 18 in both views. The edges of the opening of the shutter are not radial but are located at an angle with the radius so that all points along the upper edge of screen 18 begin exposure at the same instant $t_1$, as indicated in Figure 4, and ends exposure and starts scanning at the same instant $t_2$ as indicated in Figure 5. The lower right-hand corner of the screen 18 starts to be exposed at $t_3$ and is obscured at $t_4$.

Figure 6:
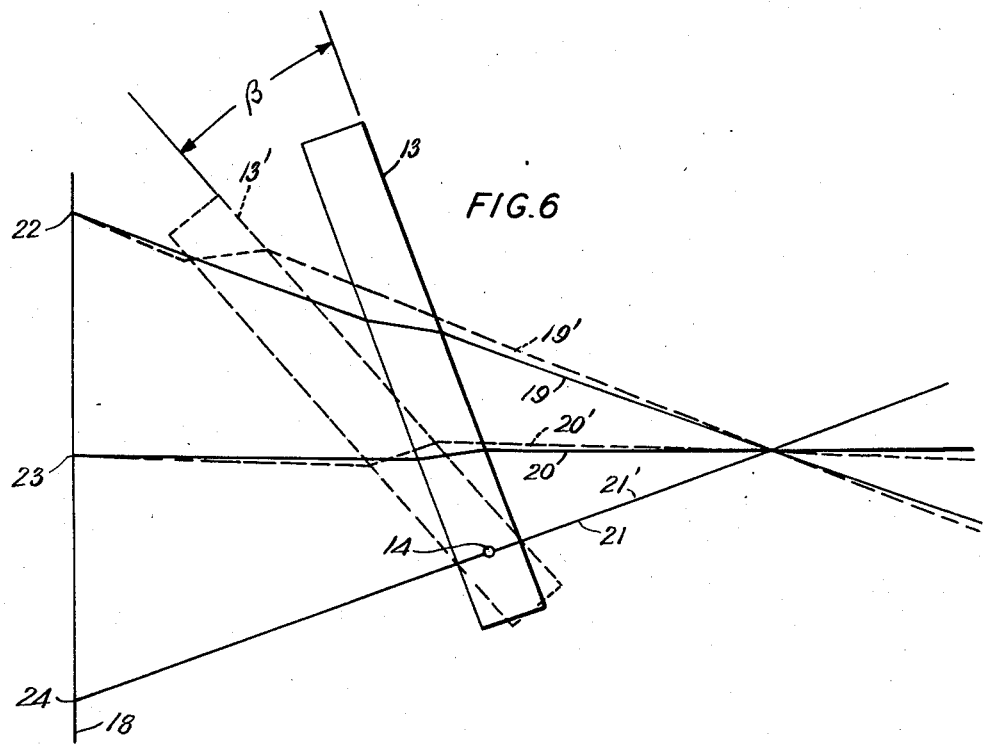
Figure 6 is a schematic diagram of one form of image immobilizer used in the transmitter.

Figure 6 shows one form of image immobilizer. A slab of refracting material such as glass is caused to oscillate about axis 14, through angle $\beta$. The three rays of light 19, 20 and 21 come, respectively, from near, medium, and far points of the ground when the plane is at a certain position. When the plane has moved a distance $L/p$ during the exposure time, the rays from the same points on the ground are represented by $19^1$, $20^1$ and $21^1$. The near ray 19 moves through a greater angle than ray 20 and ray 20 moves through a greater angle than ray 21. By a proper choice of index of refraction, thickness of plate 13, and angle $\beta$, the rays 19 and $19^1$ can be made to strike screen 18 at the same point 22 and rays 20 and $20^1$ at practically the same point 23, and rays 21 and $21^1$ at the same point 24.

Figure 7 shows some of the electrical wave forms which are important in the operation of the invention. Figure 7 lines $a$ and $b$ show on a time scale the several instants of time related to the rotation of the shutter 11 and identified in Figures 4 and 5. Figure 7, line $c$, shows the vertical sweep wave which starts at $t_2$ and ends at $t_7$. The fly-back is initiated at $t_3$ by the leading edge of the vertical synchronizing pulses shown in Figure 7 line $d$. The linear portion of the sweep is initiated at $t_2$ by the trailing edge of the vertical blanking pulses shown in Figure 7, line $e$. Figure 7, line $f$, shows the radio-frequency envelope of the composite transmitted wave, plotted to a time scale which is much expanded with respect to the time scales of the previous lines. The interval covered by Figure 7, line $f$, begins a short time before $t_1$ and ends a short time after $t_2$. The video signals of the previous scanning period continue to $t_1$ when they are blanked out at the video amplifier by the blanking wave of Figure 7, line $e$. Exposure begins at $t_1$ and the vertical sync pulse begins at $t_3$. The video signals begin again at $t_2$ which is coincident with the end of the vertical blanking pulse and the beginning of vertical sweep.

Returning now to Figure 3, transmitter in block 25 receives high voltage power from the rectifier system in block 26, and filament heating power from an alternating-current power source in block 27, which also supplies power to the rectifier in block 26. Power generator in block 27 may be driven from a D.C. power source in block 28. A master oscillator in block 29, having a frequency of say 21,000 cycles per second, feeds power to block 30 which contains the usual circuits for forming the horizontal synchronizing pulses and the horizontal blanking pulses. The horizontal blanking pulses are fed to block 31 containing the video amplifier, and serve to blank the amplifier during the fly-back time of the horizontal sweep. The horizontal sweep, also formed in block 30, is fed to the horizontal deflection coils 41 for tube 10. The master oscillator in block 29 also feeds the frequency dividers 32, 33, 34, and 35 which reduces the master-oscillator frequency by factors 5, 5, 7 and 4, respectively, assumed for illustration. This provides the vertical synchronizing frequency of 30 cycles and gives the number of horizontal lines in the frame of 700 multiplied by the factor $$\frac{t_2 - t_7}{t_1 - t_5}$$

or about 622 lines for the shutter shown in Figures 4 and 5.

Block 35 feeds power of a frequency of 30 cycles per second to block 36 wherein the vertical synchronizing pulses shown in Figure 7, line $d$, the vertical blanking pulses shown in Figure 7, line $e$, and the vertical sweep wave shown in Figure 7, line $c$ are formed. The vertical sweep wave is fed to the vertical deflection coils 37 of tube 10. The vertical blanking pulses are fed to the video amplifier in block 31 and deactivates the amplifier during the blanking pulse.

The horizontal sync and blanking pulses pass over line 38 to the circuits which form the supersync wave in block 40. The vertical sync and blanking waves also contribute to the supersync wave and are fed over line 39 to block 40.

The video signals from the pick-up tube 10 are fed to the video amplifier in block 31. The video signals from block 31 are added to the supersync wave from block 40 in the voltage adder in block 42. The composite signal shown in Figure 7, line $f$, is then fed to the transmitter in block 25.

A monitor in block 43 is operated by the composite signal from block 42 and serves to show to the operator the picture being transmitted and to aid him in making necessary adjustments.

Power of vertical sweep frequency from block 35 is amplified in block 44 and drives the synchronous motor 12 at $$\frac{1}{T_f}$$

revolution per second in a two-pole section of the motor. In order to fix more definitely the phase of the disk shutter the motor is also driven in an eight-pole section by power of frequency $$\frac{4}{T_f}$$

This power is derived from a power amplifier in block 45 which is driven from a voltage taken off the frequency divider at point 46. A phase shifter in block 47 in the drive line for the amplifier in block 45 serves to make fine adjustment of phase to bring instant $t_3$ for the shutter in coincidence with the leading edge of the vertical sync pulse.

Figure 8 shows the essential elements in the receiving station. A standard type receiver in block 50 derives the modulation or composite signal from the radio wave in the usual manner. The composite signal is separated in the circuits of block 51 into video signals passed onto a video amplifier in block 52, and vertical and horizontal synchronizing signals. The latter are fed to blocks 53 and 54. In block 53 the horizontal sweep wave is formed in a well known manner and is fed to the horizontal deflection coils 55 of observation tube 56, and also to horizontal deflection coils 57 of recording tube 58. Similarly the vertical sync pulse is fed to block 54 and forms therein the vertical sweep wave which is fed to the vertical deflection coils 59 for tube 56 and to coils 60 for tube 58. The video signal from video amplifier in block 52 passes directly to the beam-modulating grid of picture tube 56, and through sense reversing circuits in block 61 to the beam-modulating grid of recording picture tube 58. The image on the screen of tube 58 is, therefore, the negative of the image on the screen of tube 56 which is adapted for observation of the views as seen from the plane.

A lens $61^1$ forms on film 62 an image of the negative picture which appears on the screen of tube 58. Film 62 is advanced one frame for each picture by a mechanical mechanism in block 63 which is actuated at the proper time by electrical impulses over line 64, the origin of which will be described later.

Each frame photographed is identified by photographing on the margin of the frame an image of a clock 73, giving time numerically, reflected in the glass plate 74 interposed between lens $61^1$ and the screen of picture tube 58.

The film 62 moves through the rapid-processing system in block 65, which may be of the type developed by the Eastman Kodak Company for use in the Ultrafax system or of the type sold on the market as the Kenyon Rapromatic Processor. The film after processing is fed into the reservoir 66, and then at the desire of the observer into the projector 67 which throws a positive image on screen 68.

Since photographic records are made once every $n$ frames, where $n$ is of the order of 20 or more, impulses for actuating the film-advance mechanism in block 63 are formed from the vertical sync pulses in the following way. The vertical sync pulses from block 54 act upon a frequency-dividing chain comprising dividers in blocks 69 and 70. Pulses thus formed are amplified in block 71 and pass over line 64 to the film advance mechanism in block 63. The sense reversal circuits in block 61 are blanked for all frames except the ones photographed by pulses formed in the multivibrator circuits in block 72.

Figure 9 shows in schematic form the circuits in block 72. The vertical synchronizing pulse from block 54, shown in trace $a$ of Figure 10 are given for reference. Pulses from block 70 of a much lower frequency than that of the synchronizing pulses enters the circuit of Figure 9 by line 80. One of these pulses is shown at the beginning of trace $a$ of Figure 10. Differentiated by capacitor 81 and resistor 82, the positive going spikes from the leading edge of one of these pulses acts upon the grid of amplifier tube 83. Negative going spikes from the plate of tube 83 trigger the monostable multivibrator comprising tubes 84 and 85. Normally tube 85 is conducting while tube 84 is non-conducting. The negative pulse from the plate of tube 83, acting through capacitor 86 upon the grid of tube 85, causes it to become non-conducting and tube 84 to become conducting. The duration of this state is determined by the capacitance 86 and resistance 87, and is made to be equal to $T_t$ which is also the time between two vertical sync pulses of trace $a$ of Figure 10. The resulting plate voltage of tube 85 is shown in trace $c$ of Figure 10.

When tube 85 suddenly returns to the conducting state, a pulse from its plate, acting through capacitor 88, triggers a second monostable multivibrator comprising tubes 89 and 90, the latter being normally conducting. The plate voltage of tube 90 is shown in trace $d$ of Figure 10, where the return of tube 90 to the conducting state is adjusted to be at the time of the next vertical sync pulse by adjustment of capacitance 91 and resistance 92. The plate voltage of tube 90 is caused to control the passage of video signals through block 61 in Figure 8. Hence a picture appears on the screen of picture tube 58 only while the voltage of the plate of tube 90 is more positive than at other times as shown in trace $d$ of Figure 10.

The pulse on line 80 also acts upon the grid of amplifier tube 93 and causes a pulse, shown in trace $b$ of Figure 10 to act over line 64 upon the film-advancing mechanism in block 63. In this way the film is advanced $T_t$ seconds before the video signals pass through block 61 to produce an image on the screen of tube 58. This image then persists only during the next scanning interval.

Although only a few of the various forms in which this invention may be embodied have been shown herein, it is to be understood that the invention is not limited to any specific construction but may be embodied in various forms without departing from the spirit of the invention.

What is claimed is:

1. A ground survey system comprising a television-type transmitter including a camera tube to be carried along a horizontal path at a uniform speed and height above the ground and pointed in an inclined direction in the plane of said path to include in its field selected areas of ground which are displaced from the area directly below the camera and various parts of which are disposed at different slant ranges from said camera, timed means exposing said tube to the image of said areas for fixed exposure periods, optical means synchronized with said timed exposure means and adapted to shift light rays from the different parts of said area by different amounts proportional to the slant range of said parts in a manner to immobilize the image on said tube during the exposure periods, means scanning the immobilized image on said tube during scanning intervals between said exposure periods to produce video signals, means transmitting said signals to a receiving station, and means at said receiving station including a picture tube to receive said video signals and produce therefrom a succession of over-lapping images on said picture tube.

2. In a system as set forth in claim 1 means at said receiver for selecting said signals for certain spaced scanning periods, means actuating said picture tube by said selected signals, and means photographing said images on a film.

References Cited in the file of this patent

UNITED STATES PATENTS

| | | |
|---|---|---|
| 2,219,120 | Somers | Oct. 22, 1940 |
| 2,275,898 | Goldsmith | Mar. 10, 1942 |
| 2,333,768 | Davis et al. | Nov. 9, 1943 |
| 2,373,114 | Goldsmith | Apr. 10, 1945 |
| 2,485,594 | Hallmark | Oct. 25, 1949 |
| 2,709,716 | Haller | May 31, 1955 |
| 2,714,131 | Gillette et al. | July 26, 1955 |
| 2,798,116 | Wiens | July 2, 1957 |

FOREIGN PATENTS

| | | |
|---|---|---|
| 477,355 | Great Britain | Dec. 28, 1937 |